United States Patent
Breslav

(10) Patent No.: US 11,328,167 B2
(45) Date of Patent: May 10, 2022

(54) OPTICAL CHARACTER RECOGNITIONS VIA CONSENSUS OF DATASETS

(71) Applicant: Hewlett-Packard Development Company, L.P., Spring, TX (US)

(72) Inventor: Mikhail Breslav, Palo Alto, CA (US)

(73) Assignee: Hewlett-Packard Development Compant, L.P., Spring, TX (US)

( * ) Notice: Subject to any disclaimer, the term of this patent is extended or adjusted under 35 U.S.C. 154(b) by 22 days.

(21) Appl. No.: 16/615,807

(22) PCT Filed: Jul. 21, 2017

(86) PCT No.: PCT/US2017/043223
§ 371 (c)(1),
(2) Date: Nov. 21, 2019

(87) PCT Pub. No.: WO2019/017961
PCT Pub. Date: Jan. 24, 2019

(65) Prior Publication Data
US 2020/0134348 A1    Apr. 30, 2020

(51) Int. Cl.
*G06K 9/03* (2006.01)
*G06K 9/00* (2006.01)

(52) U.S. Cl.
CPC .......... *G06K 9/03* (2013.01); *G06K 9/00483* (2013.01); *G06K 2209/01* (2013.01)

(58) Field of Classification Search
CPC .. G06K 9/03; G06K 9/00483; G06K 2209/01; G06K 9/6292
See application file for complete search history.

(56) References Cited

U.S. PATENT DOCUMENTS

| | | | |
|---|---|---|---|
| 5,519,786 A | 5/1996 | Courtney et al. | |
| 6,205,261 B1 | 3/2001 | Goldberg | |
| 8,611,661 B2 * | 12/2013 | Nestares | G06K 9/6857 382/176 |
| 9,305,227 B1 | 4/2016 | Nambiar et al. | |
| 2012/0177295 A1 * | 7/2012 | Gronau | G06K 9/03 382/218 |
| 2013/0142442 A1 | 6/2013 | Metayer | |

(Continued)

OTHER PUBLICATIONS

Hollaus, F. et al., Improving OCR Accuracy by Applying Enhancement Techniques on Multispectral Images, Aug. 24-28, 2014, < http://dl.acm.org/citation.cfm?id=2704137 >.

(Continued)

*Primary Examiner* — Wesley J Tucker
(74) *Attorney, Agent, or Firm* — Perry + Currier Inc

(57) ABSTRACT

An example of apparatus includes a memory to store a first image of a document and a second image of the document. The first image and the second image are Memory captured under different conditions. The apparatus includes a processor coupled to the memory. The processor is to perform optical character recognition on the first image to generate a first output dataset and to perform optical character recognition on the second image to generate a second output dataset. The processor is further to determine whether consensus for a character is achieved based on a comparison of the first output dataset with the second output dataset, and generate a final output dataset based on the consensus for the character.

15 Claims, 16 Drawing Sheets

(56) References Cited

U.S. PATENT DOCUMENTS

| | | | | |
|---|---|---|---|---|
| 2014/0168478 A1* | 6/2014 | Baheti | .................. | G06K 9/3258 |
| | | | | 348/240.99 |
| 2015/0213330 A1 | 7/2015 | Chulinin | | |
| 2015/0281739 A1* | 10/2015 | Russell | ................ | G06K 9/6857 |
| | | | | 382/182 |
| 2016/0092745 A1* | 3/2016 | Wada | ................... | G06K 9/6215 |
| | | | | 382/177 |
| 2019/0019049 A1* | 1/2019 | Takakura | ............. | G06K 9/2027 |
| 2019/0279016 A1* | 9/2019 | Takabayashi | ........ | G06K 9/2054 |
| 2020/0184207 A1* | 6/2020 | Breslav | ................... | G06T 7/337 |

OTHER PUBLICATIONS

Kassymkhanova, D. et al., Majority Voting Approach and Fuzzy Logic Rules in License Plate Recognition Process, Oct. 15-17, 2014, <http://ieeexplore.ieee.org/document/7035933/ >.

* cited by examiner

OPTICAL CHARACTER RECOGNITIONS VIA CONSENSUS OF DATASETS

BACKGROUND

Printed documents are often used to present information. In particular, printed documents continue to be used despite the availability of electronic alternatives as they are more easily handled and read by users. As electronic alternatives to store the printed documents proliferate, storing documents as images is gaining in popularity.

Images of documents generally contain text. When stored as an image, the text is represented by pixels of varying color and not readily recognizable as characters to most processors.

BRIEF DESCRIPTION OF THE DRAWINGS

Reference will now be made, by way of example only, to the accompanying drawings in which.

DETAILED DESCRIPTION

Figure 1:
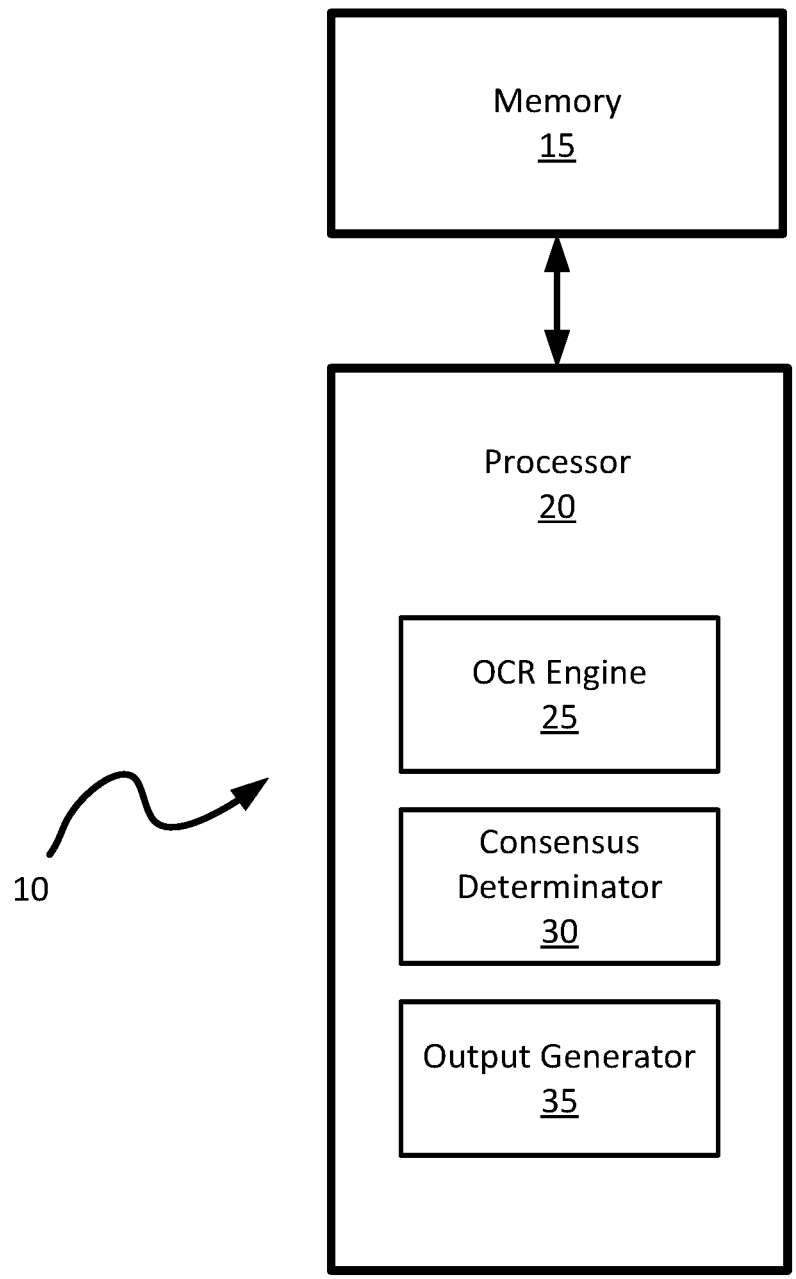
FIG. 1 is a block diagram of an example apparatus to perform optical character recognition via consensus of datasets.

Printed documents may be widely accepted, may often be more convenient to use. In particular, printed documents are easy to distribute, store, and be used as a medium for disseminating information. In addition, printed documents may serve as contingency for electronically stored documents, such as may happen when an electronic device fails, such as with a poor data connection for downloading the document and/or a depleted power source. However, it may often be desired to convert printed documents into an electronic format for further analysis and/or storage.

Conversion of printed documents into an electronic format may be carried out with an optical character recognition (OCR) engine. An optical character recognition engine may use an algorithm to analyze a group of pixels in an image to determine if the group of pixels represents a character and to identify the character. Various factors may affect the accuracy of the optical character recognition engine, such as the contrast of the character relative to the background, the font of the character, the focus of the image, the font of the character, the material of the document, the ambient lighting, and rotations and translations of portions of the document, such as due to a fold or deformation caused by environmental changes such as temperature and/or humidity. Settings of the image sensor, such as gain, white balance, contrast, resolution, noise characteristics, and lens characteristics may affect the accuracy of the optical character recognition engine.

Images of printed documents may be obtained via multiple sources. For example, a camera may be used to take a photograph of the document, which may be used as a document image. As another example, a scanner device may be used to capture the image of the document. As another example, the image may be received via a communications interface, such as over a network. When multiple images of the same document are taken under different conditions, the application of the optical character recognition engine to individual images may result in different results despite the images are ultimately taken of the same printed document. The difference in results may result due to the changes in the factors mentioned above. For example, differences between different output datasets in optical character recognition for the same document can occur as a result of changes in the orientation and position of the image sensor, such as a camera, relative to the document, changes in the image sensor settings, such as focal length, exposure, white balance, gain, etc., and varying ambient lighting conditions.

Optical character recognition engines may be prone to errors when they process images of printed documents. To address this issue, a consensus based approach may be applied to combine outputs from an optical character recognition engine being applied to multiple images of the same printed document, as discussed in greater detail below. In addition, more than one optical character recognition engine may be applied to the images to increase the number of samples from which the consensus is derived.

Referring to FIG. 1, an apparatus is shown at 10. The apparatus 10 may include additional components, such as various interfaces and/or displays to receive from and to provide input to a user.

The apparatus 10 is to determine whether consensus is achieved between multiple images of a printed document with characters. For example, the apparatus 10 may receive multiple images via a communications interface, such as a network interface card, or via an image capturing device. In the present example, the apparatus 10 includes a memory 15 and a processor 20. The processor 20 may be to operate an optical character recognition engine 25 as well as carry out a set of instructions 30 to determine whether consensus is achieved and a set of instructions 35 to generate a final output dataset based on the consensus, as discussed in greater detail below.

Figure 2:
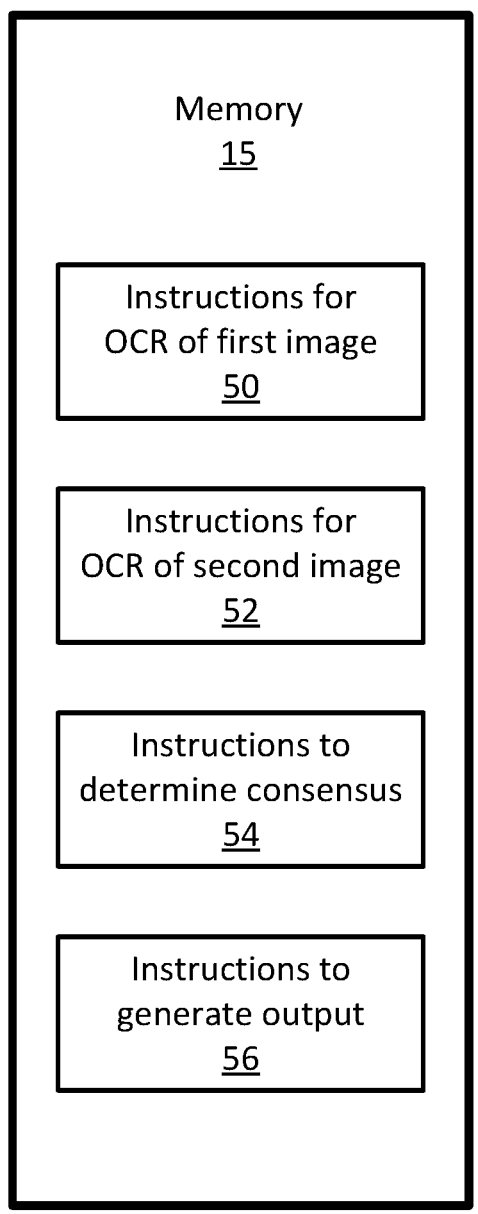
FIG. 2 is a block diagram of an example memory of the apparatus shown in FIG. 1.

The memory 15 is coupled to the processor 20 and may include a non-transitory machine-readable storage medium that may be any electronic, magnetic, optical, or other physical storage device. In the present example, the memory 15 stores multiple images of a printed document. The memory 15 may also store executable instructions. For example, the memory 15 may include a first set of instructions 50 to generate a first plurality of characters from optical character recognition of a first image, a second set of instructions 52 to generate a second plurality of characters from optical character recognition of a second image, a third set of instructions 54 to determine whether consensus for a character is achieved based on the first plurality of characters and the second plurality of characters, and a fourth set of instructions 56 to generate a final output dataset based on the first plurality of characters and the second plurality of characters, as shown in FIG. 2. The non-transitory machine-readable storage medium may include, for example, random access memory (RAM), electrically-erasable programmable read-only memory (EEPROM), flash memory, a storage drive, an optical disc, and the like. The machine-readable storage medium may be encoded with executable instructions to initiate the printing of electronic messages. In addition, the machine-readable storage medium may also be encoded with data such as additional images of the documents as well as output datasets from the optical character recognition engine 25.

The memory 15 may also store an operating system that is executable by the processor 20 to provide general functionality to the apparatus 10, including functionality to support applications the optical character recognition (OCR) engine 25 and the set of instructions 30 to determine whether consensus is achieved and a set of instructions 35 to generate a final output dataset based on the consensus. Examples of operating systems include Windows™, macOS™, iOS™, Android™, Linux™, and Unix™. The memory 15 may additionally store applications that are executable by the processor 20 to provide specific functionality to the apparatus 10, such as functionality to maintain a plurality of images of printed documents as well as.

The processor 20 may include a central processing unit (CPU), a microcontroller, a microprocessor, a processing core, a field-programmable gate array (FPGA), or similar. The processor 20 and memory 15 may cooperate to execute instructions. For example, the optical character recognition (OCR) engine 25 may be carried out by the processor 20 that executes instructions stored on the memory 15. In other examples, the optical character recognition (OCR) engine 25 may be substituted with an external engine, such as from a software as a service provider.

Figure 3:
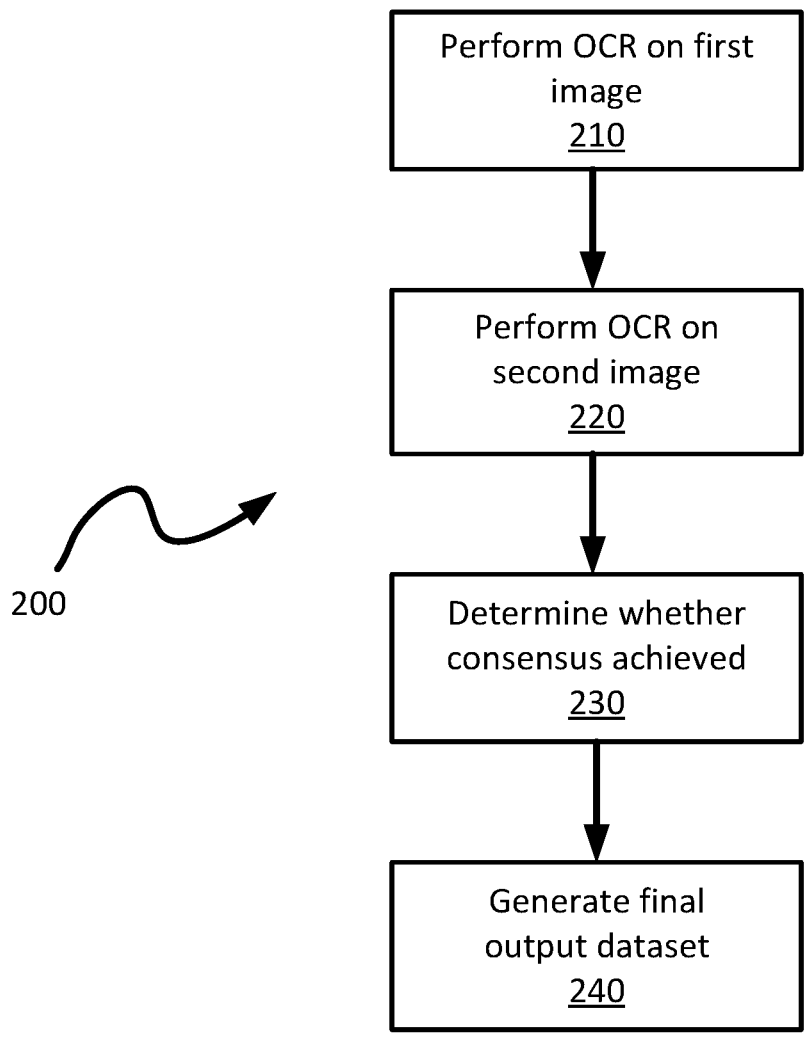
FIG. 3 is a flowchart of an example of a method of optical character recognition via consensus of datasets.

Referring to FIG. 3, a flowchart of a method of recognizing characters in a printed document is shown at 200. In order to assist in the explanation of method 200, it will be assumed that method 200 may be performed with the apparatus 10, and specifically by the processor 20. Indeed, the method 200 may be one way in which apparatus 10 may be configured. Furthermore, the following discussion of method 200 may lead to a further understanding of the processor 20, and apparatus 10 and its various components. Furthermore, it is to be emphasized, that method 200 need not be performed in the exact sequence as shown, and various blocks may be performed in parallel rather than in sequence, or in a different sequence altogether.

Prior to the commencement of the method 200, two images of the same document are provided in the present example. As mentioned before, other examples may process more images of the document. In the present example, the images are stored on the memory 15. The manner by which the images are loaded in to the memory 15 is not particularly limited. For example, the images may be captured with an optional image capture device connected to the memory 15. As another example, the images may be transferred to the memory 15 via an optional communications interface over a network, such as the Internet, or transferred manually with a portable computer readable storage medium, such as an optical disc or a flash drive.

Beginning at block 210, an optical character recognition operation may be performed on a first image of a printed document to generate a first output dataset. The manner by which the optical character recognition operation may be carried out is not particularly limited. In the present example, the processor 20 may apply the optical character recognition (OCR) engine 25 to the first image.

Block 220 performs an optical character recognition operation on a second image of the same printed document to generate a second output dataset. In the present example, the second image is captured under different conditions, such as those discussed above. Similar to the execution of block 210, the manner by which the optical character recognition operation is carried out is not particularly limited. In the present example, the processor 20 also applies the optical character recognition (OCR) engine 25 to the second image.

Next, at block 230, the processor 20 determines whether consensus for a character in the printed image is achieved based on a comparison of the first output dataset calculated at block 210 and the second output dataset calculated at block 220. In the present example, consensus is determined based on a comparison between the first output dataset calculated at block 210 and the second output dataset calculated at block 220. In particular, the determination is made based on the first output dataset calculated at block 210 and the second output dataset calculated at block 220 to identify characters that match. For example, consensus for a character may be achieved when two conditions are satisfied: first, the character in the first output dataset calculated at block 210 is identical to a character in the second output dataset calculated at block 220; and second, the position of the character in the first output dataset calculated at block 210 is identical or close to the position of the character in the second output dataset calculated at block 220. In other examples, a confidence value or weight may be assigned to each data point in the first output dataset and the second output dataset such that consensus may be achieved by the selection of characters based on the confidence values. In yet another example, the confidence values may be compare with a predetermined threshold to determine whether a character is to be considered.

Block 240 generated a final output dataset based on the determined consensus from block 230. In the present example, the processor 20 identifies which data points from the images have a consensus and adds the character to the final output dataset.

The application of the method 200 to the images stored in the memory 15 may result in a unique final output dataset for the printed document associated with the images. Since the final output dataset is based on multiple images and the application of the optical character recognition engine 25 on multiple images, errors in the optical character recognition engine 25 to various regions of an image may be mitigated due to statistical averaging. Accordingly, the overall quality of the optical character recognition engine 25 may be improved and verified with multiple images without use of an alternative optical character recognition engine for comparison. In other examples, multiple images may be combined with multiple optical character recognition engines for additional verification.

Figure 4:
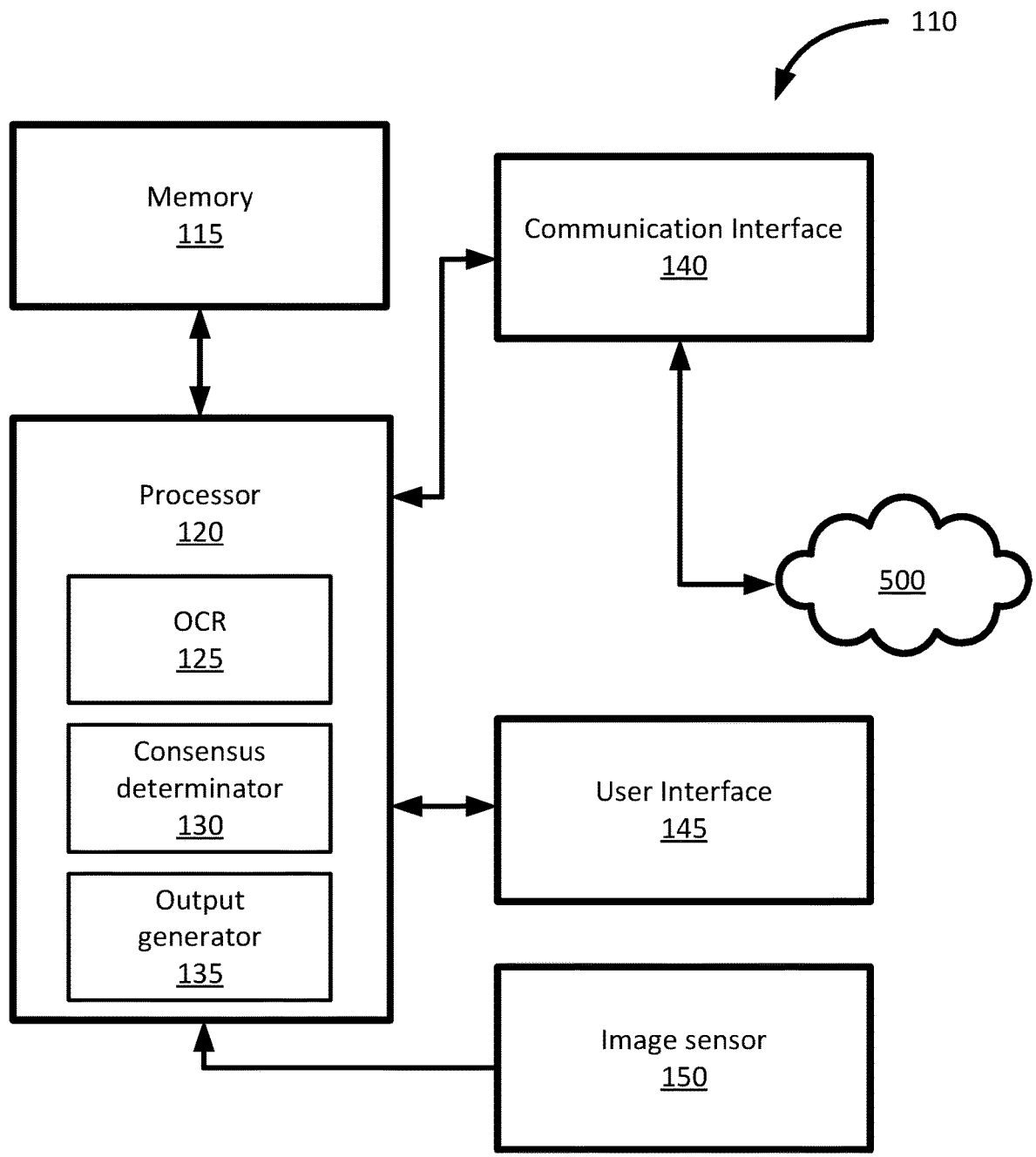
FIG. 4 is a block diagram of another example apparatus to perform optical character recognition via consensus of datasets.

Referring to FIG. 4, another apparatus is shown at 110. The apparatus 110 is another example that may be used to carry out the method 200.

The apparatus 110 is to determine whether consensus is achieved between multiple images with characters and to generate a final output dataset based on the consensus. For example, the apparatus 110 may receive multiple images via a communications interface 140, such as a network interface card, or via an image sensor 150. In the present example, the apparatus 110 includes a memory 115, a processor 120, a communications interface 140, a user interface 145, and an image sensor 150. The processor 120 may be to operate an optical character recognition (OCR) engine 125 as well as carry out a set of instructions 130 to determine whether consensus is achieved and a set of instructions 135 to generate output based on the consensus, as discussed in greater detail below.

The memory 115 is coupled to the processor 120 and may include a non-transitory machine-readable storage medium that may be any electronic, magnetic, optical, or other physical storage device. In the present example, the memory 115 stores multiple images of a printed document. The memory 115 also stores executable instructions for the processor 120 to execute. The non-transitory machine-readable storage medium may include, for example, random access memory (RAM), electrically-erasable programmable read-only memory (EEPROM), flash memory, a storage drive, an optical disc, and the like. The machine-readable storage medium may be encoded with executable instructions for initiating the printing of electronic messages. In addition, the machine-readable storage medium may also be encoded with data such as additional images of the documents as well as output datasets from the optical character recognition (OCR) engine 125.

The memory 115 may also store an operating system that is executable by the processor 120 to provide general functionality to the apparatus 110, including functionality to support applications, the optical character recognition (OCR) engine 125, the set of instructions 130 to determine whether consensus is achieved and a set of instructions 135 to generate a final output dataset based on the consensus. Examples of operating systems include Windows™, macOS™, iOS™, Android™, Linux™, and Unix™' The memory 115 may additionally store applications that are executable by the processor 120 to provide specific functionality to the apparatus 110, such as functionality to maintain a plurality of images of printed documents as well as.

The processor 120 may include a central processing units (CPU), a microcontroller, a microprocessor, a processing core, a field-programmable gate array (FPGA), or similar. The processor 120 and memory 115 cooperate to execute instructions. For example, the optical character recognition (OCR) engine 125 may be carried out by the processor 120 using instructions stored on the memory 115. In other examples, the optical character recognition (OCR) engine 125 may be substituted with an external engine, such as from a software as a service provider.

The communications interface 140 may be coupled to the processor 120 and allows the processor 120 to communicate with a network 500 to send and receive data. The network 500 may provide a link to another device, or content provider, such as a cloud network drive storing images of the document. The communications interface 140 may include a universal serial bus (USB) port, a serial port, a parallel port, a wired network adaptor, a wireless network adaptor, or similar.

The user interface 145 receives input from a user and/or generates output in a human perceptible form. The user interface 145 may include one or more user interface devices, such as a display device, a touchscreen, a keyboard, a mouse, a button, a speaker, a microphone, or similar. The user interface 145 may be coupled to the processor 120 to present information to a user in human-perceptible form, such as by rendering a graphical user interface (GUI). The user interface 145 may receive input from a user through the GUI and provide such user input to the processor 120. For example, the GUI may allow a user to enter the ground truth dataset of an image of a printed document. The instructions carried out by the processor 120 to allow entry of a ground truth dataset is not particularly limited and may be part of the OCR engine 125 or provided by a separate module.

The image sensor 150 may include a camera or a scanner for capturing one or more images. The images may be subsequently stored in the memory 115 for processing as described in greater detail below.

Figure 6A:
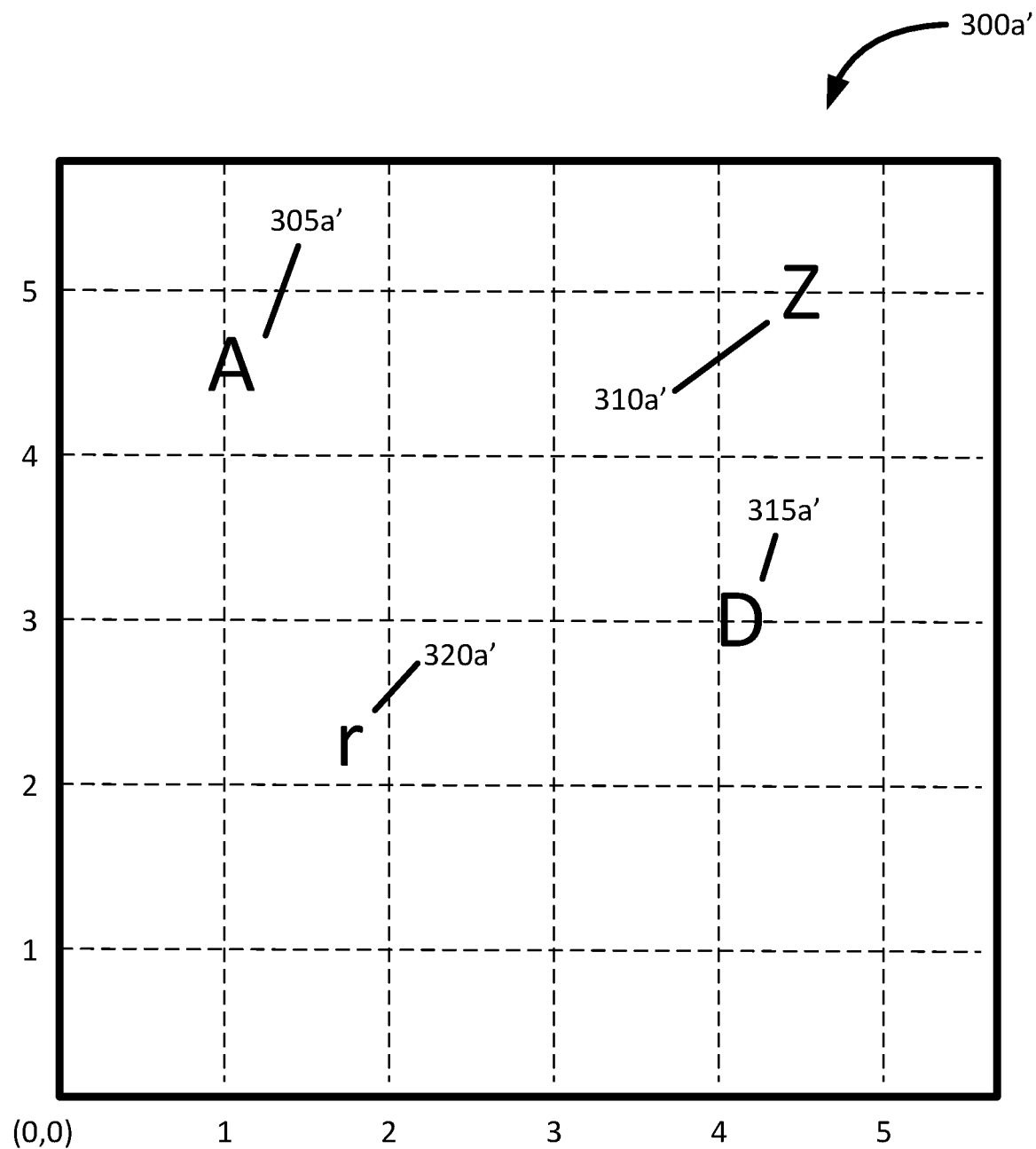
FIGS. 6a-e are examples of output from the OCR engine applied to the images in FIGS. 5a-e.
Figure 6B:
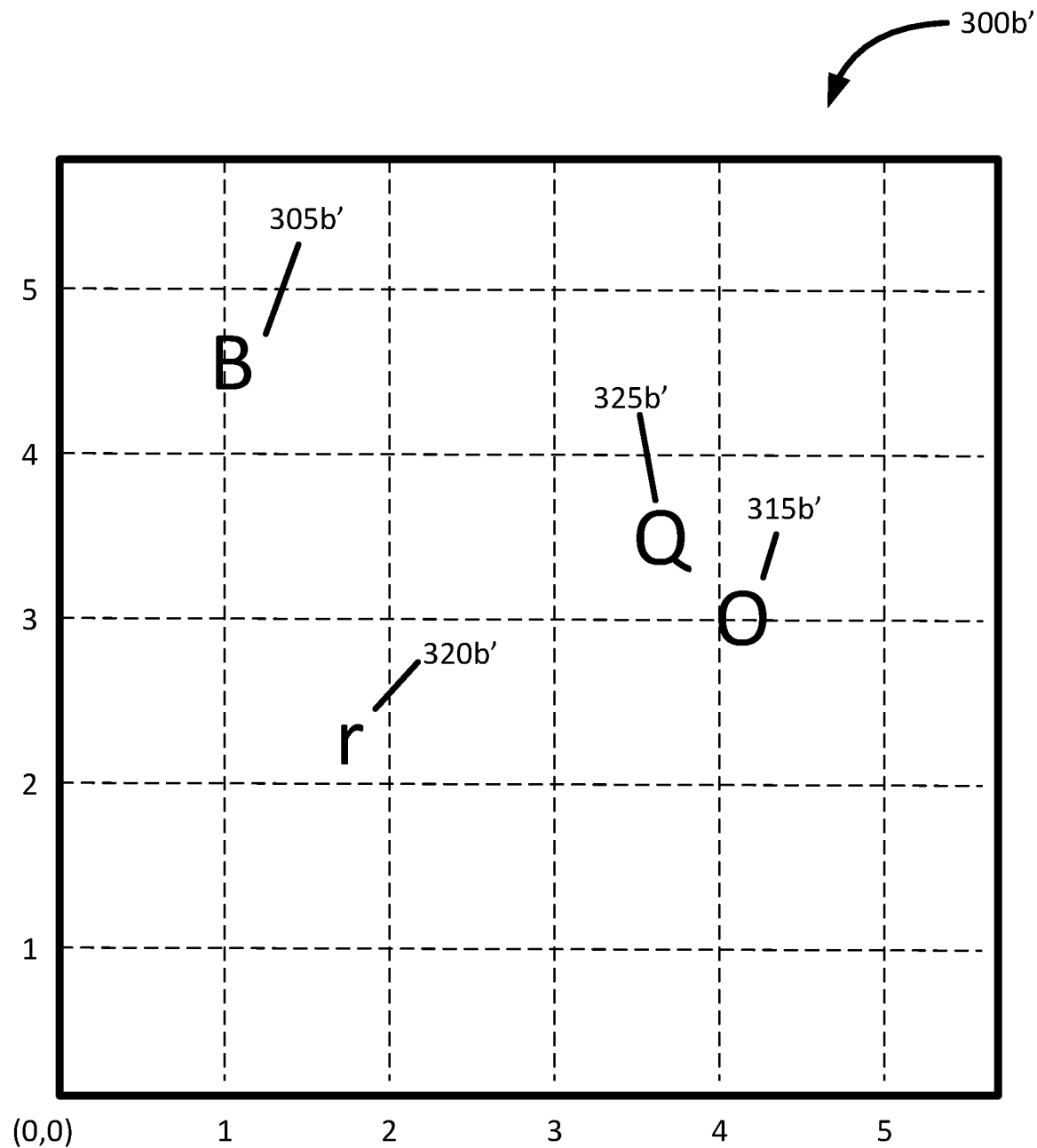
Figure 6C:
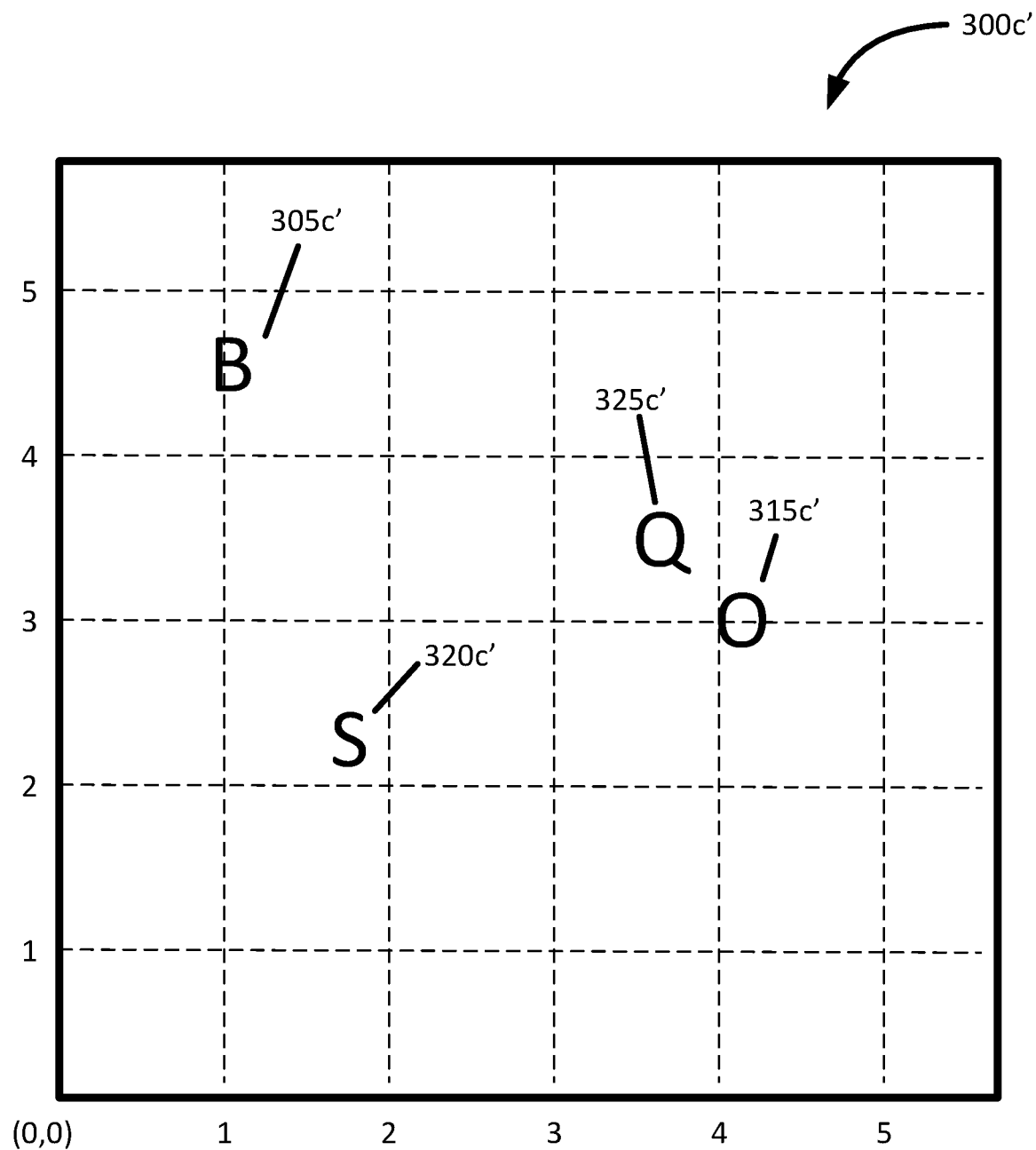
Figure 6D:
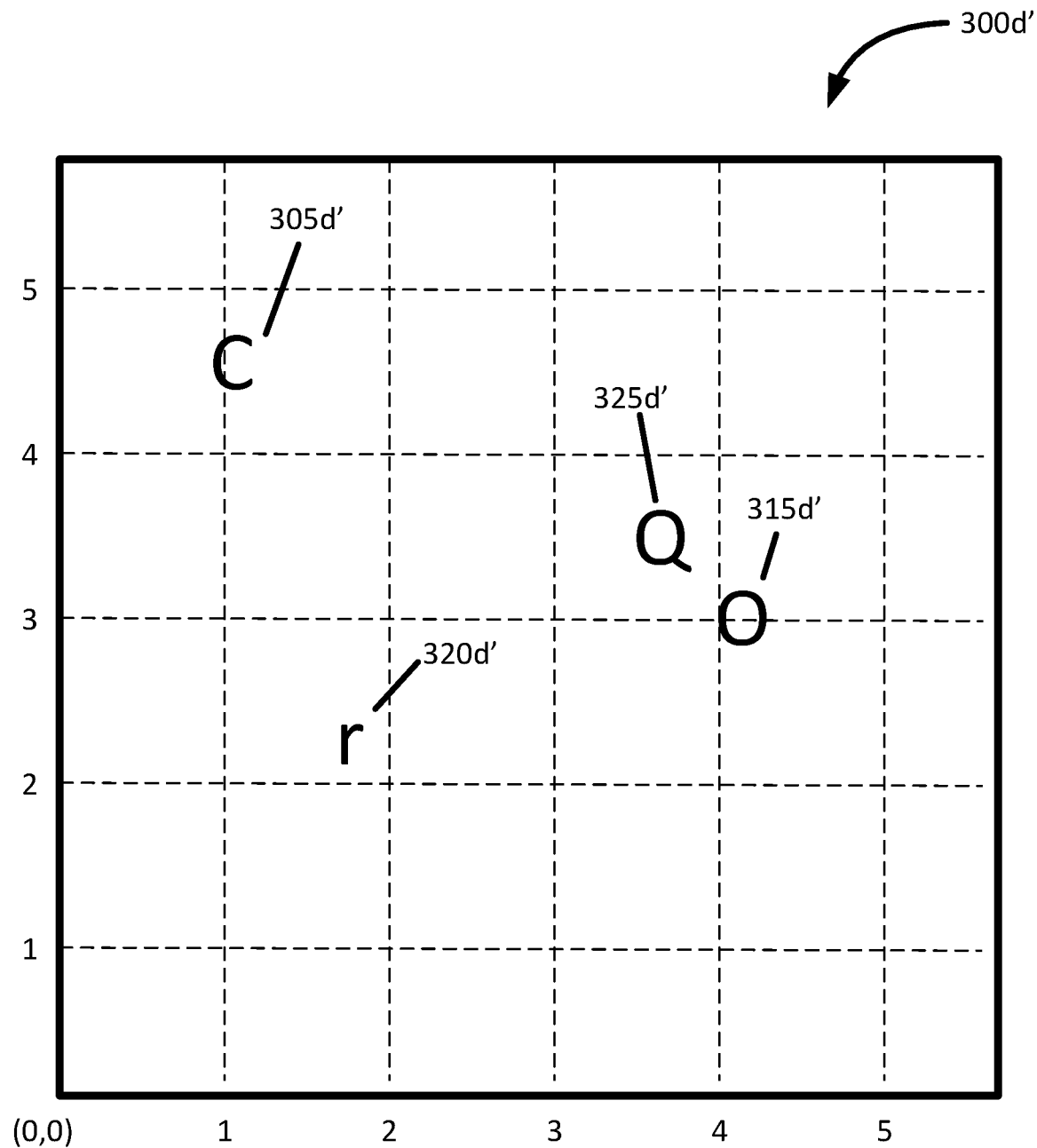
Figure 6E:
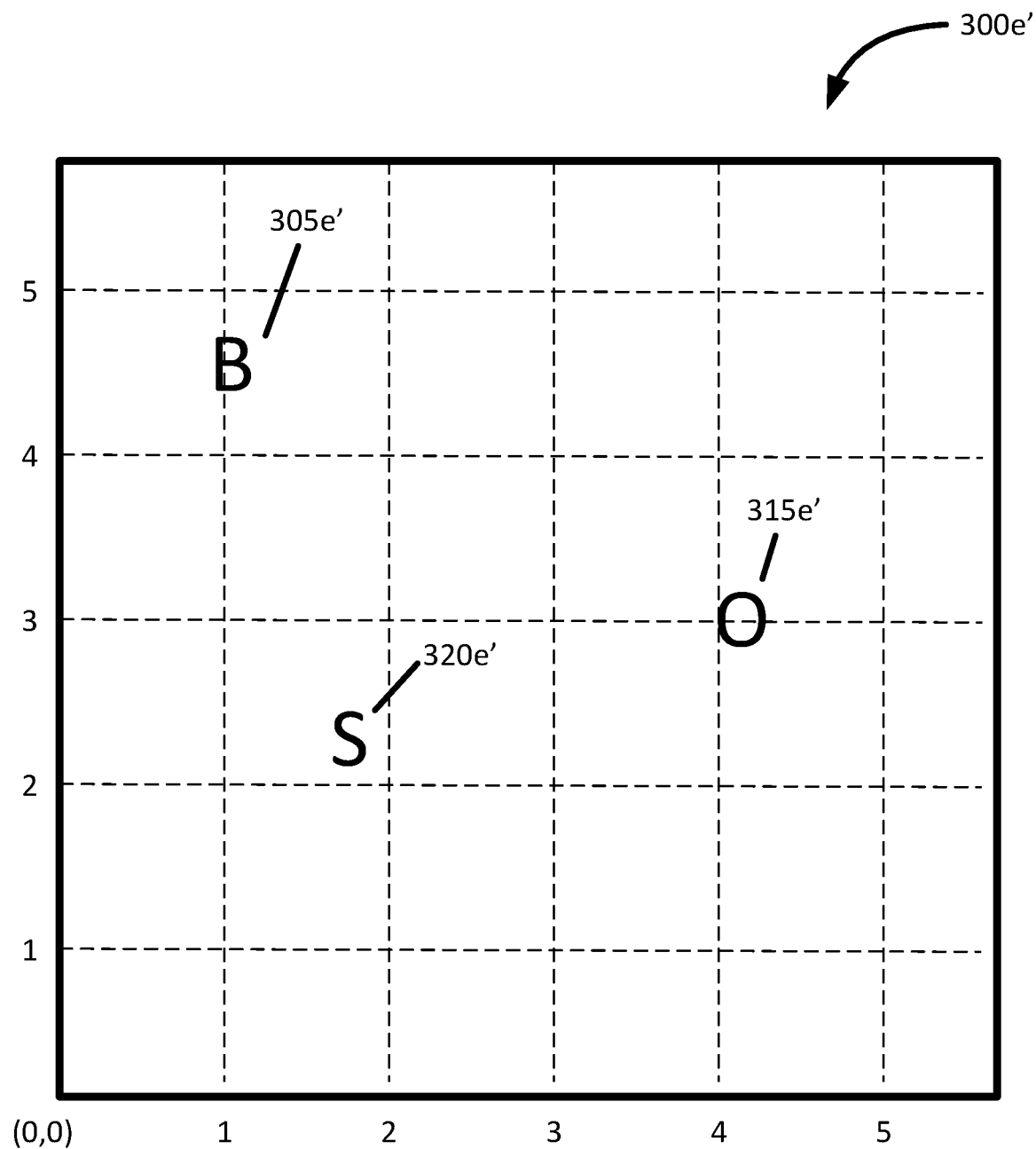
Figure 7:
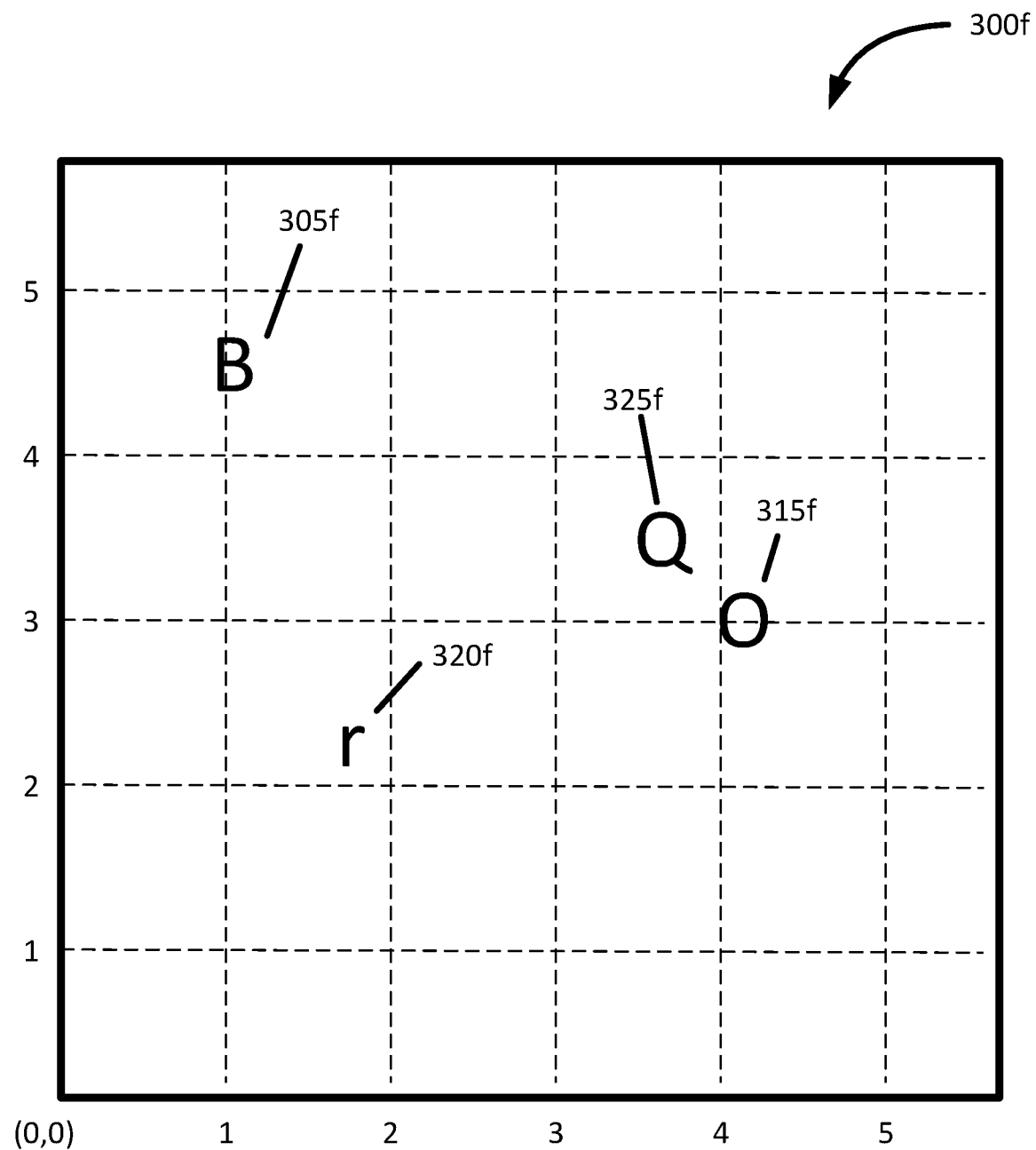
FIG. 7 is an example of an output dataset from the output shown in FIGS. 6a-e.

Referring to FIGS. 5 to 7, the execution of the method 200 by the apparatus 10 or 110 is illustrated using a specific example.

FIGS. 5a to 5e show five raw images 300a to 300e (generically, these images are referred to herein as "image 300" and collectively they are referred to as "images 300", this nomenclature is used elsewhere in this description), respectively, of a printed document captured under different conditions. Although the images 300 are from a single printed document, the different conditions provide features that may appear slightly different, as will be discussed in greater detail below.

Figure 5A:
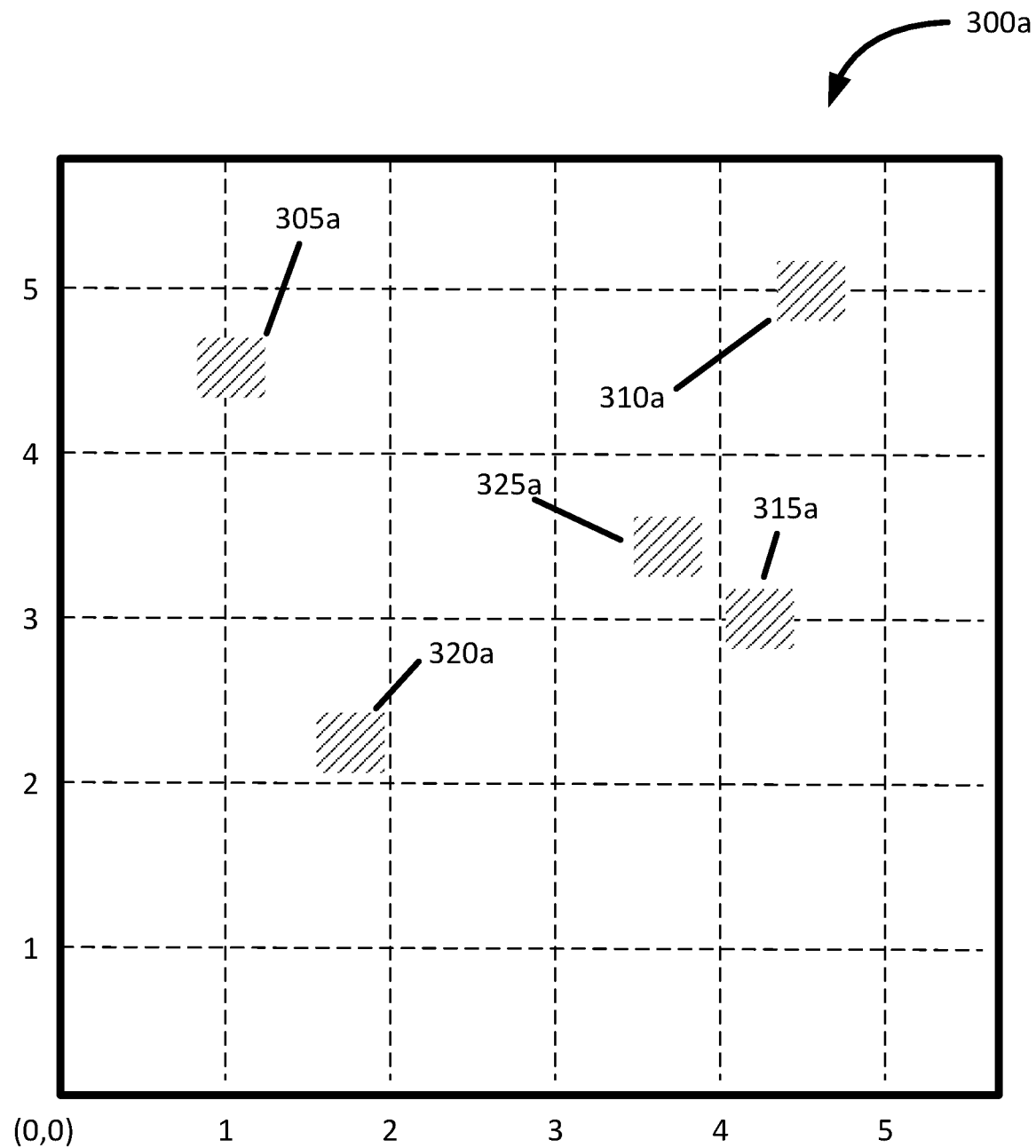
FIGS. 5a-e are examples of images of a document for use with the apparatus shown in FIG. 1 or FIG. 4.

FIG. 5a shows an image 300a of a printed document with five features. The image 300a includes a first feature 305a, a second feature 310a, a third feature 315a, a fourth feature 320a, and a fifth feature 325a. The image 300a may also be assigned a non-limiting coordinate system. For example, the coordinate system may correspond to the number of pixels along the edge of the image 300a. In the present example, the coordinate system may be a Cartesian coordinate system where the values are arbitrarily assigned across the image.

The feature 305a appears at a position approximately (1.10,4.60) on the assigned coordinate system. The definition of the position of the feature 305a is not particularly limited and the position may be defined to be the center of the feature 305a or a corner of the feature 305a. In the present example, the feature 305a may represent a character of the Roman alphabet. The feature 305a is not limited to the Roman alphabet, and may include other types of characters such as Arab, Persian, or Cyrillic scripts. The feature 305a may also represent a word for languages that use logograms such as Chinese, Japanese, and Korean. Alternatively, the feature 305a may also be an artifact, such as a dark or bright portion of the image 300a that does not correspond to any character or word.

The feature 310a appears at a position approximately (4.60,5.00) on the assigned coordinate system. The feature 310a may have similar characteristics as the feature 305a. In particular, the feature 310a may represent a character of the Roman alphabet. The feature 310a may also represent a different character or word from the feature 305a or the feature 310a may represent an artifact not associated with a character.

The feature 315a appears at a position approximately (4.15,3.00) on the assigned coordinate system. The feature 315a may have similar characteristics as the feature 305a and the feature 310a. In particular, the feature 315a may represent a character of the Roman alphabet. The feature 315a may also represent a different character from the feature 305a and/or the feature 310a or the feature 315a may represent an artifact not associated with a character.

The feature 320a appears at a position approximately (1.75,2.30) on the assigned coordinate system. The feature 320a may have similar characteristics as the feature 305a, the feature 310a, and the feature 315a. In particular, the feature 320a may represent a character of the Roman alphabet. The feature 320a may also represent a different character from the feature 305a, the feature 310a, and/or the feature 315a or the feature 320a may represent an artifact not associated with a character.

The feature 325a appears at a position approximately (3.60,3.50) on the assigned coordinate system. The feature 325a may have similar characteristics as the feature 305a, the feature 310a, the feature 315a, and the feature 320a. In particular, the feature 325a may represent a character of the Roman alphabet. The feature 325a may also represent a different character from the feature 305a, the feature 310a, the feature 315a, and/or the feature 320a or the feature 325a may represent an artifact not associated with a character.

The number of features is not particularly limited to the number shown in the present example. Although in FIG. 5a, five features are shown to illustrate the method 200, the number of features is not limited to five. The image 300a may include more or less features depending on the nature of the document. For example, many documents may be a page of text having up to 3000 characters. Alternatively, the image 300a may include fewer features for images which are not predominately text.

Figure 5B:
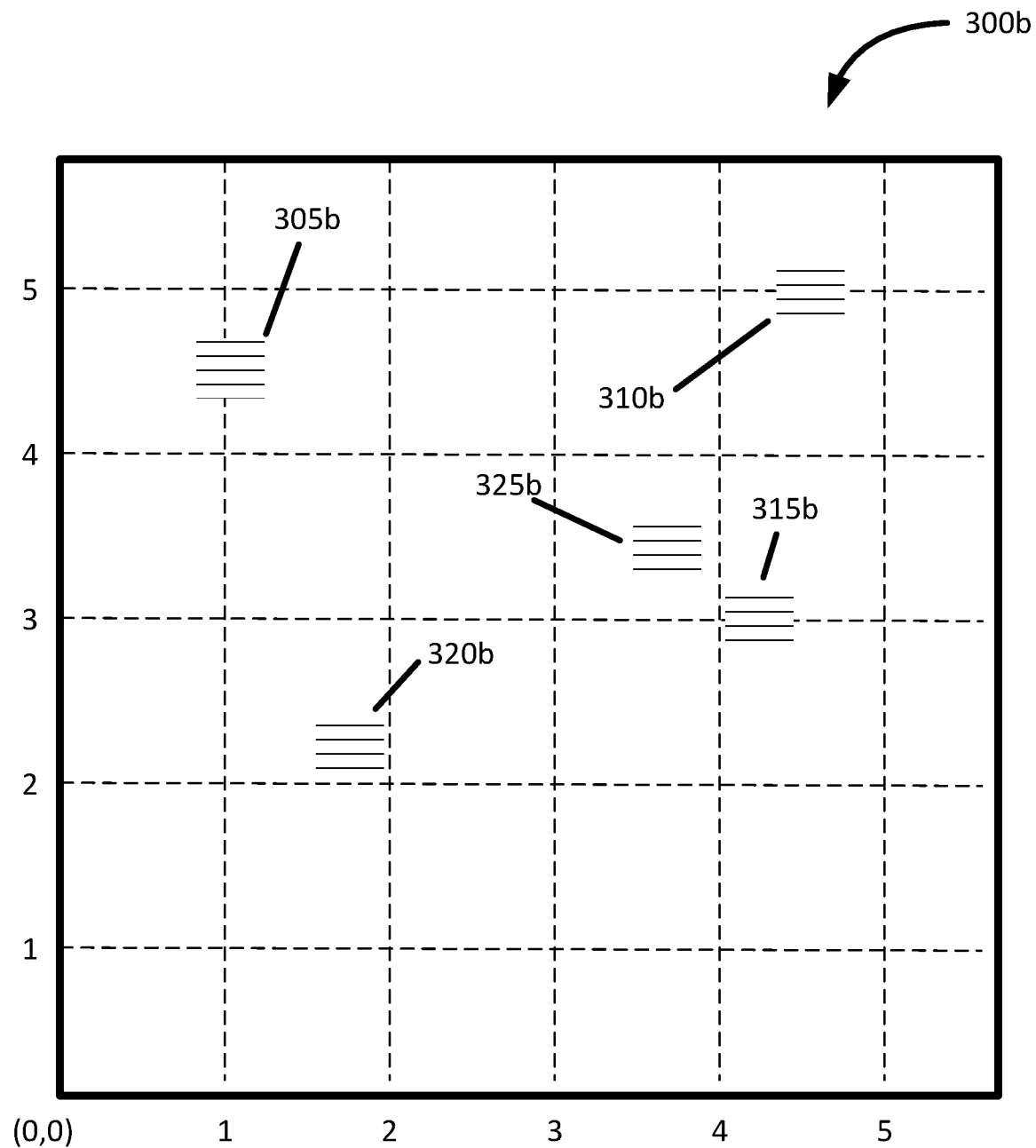

FIG. 5b shows an image 300b of a printed document with five features. The printed document shown in FIG. 5b is the same printed document as the one used for the image 300a. The image 300b was captured under different conditions from the conditions used to capture the image 300a. Accordingly, the image 300b includes a first feature 305b, a second feature 310b, a third feature 315b, a fourth feature 320b, and a fifth feature 325b. Although the features 305b, 310b, 315b, 320b, and 325b correspond to the features 305a, 310a, 315a, 320a, and 325a from the image 300a, their representation in the image 300b is different due to the different conditions under which they were captured.

Figure 5C:
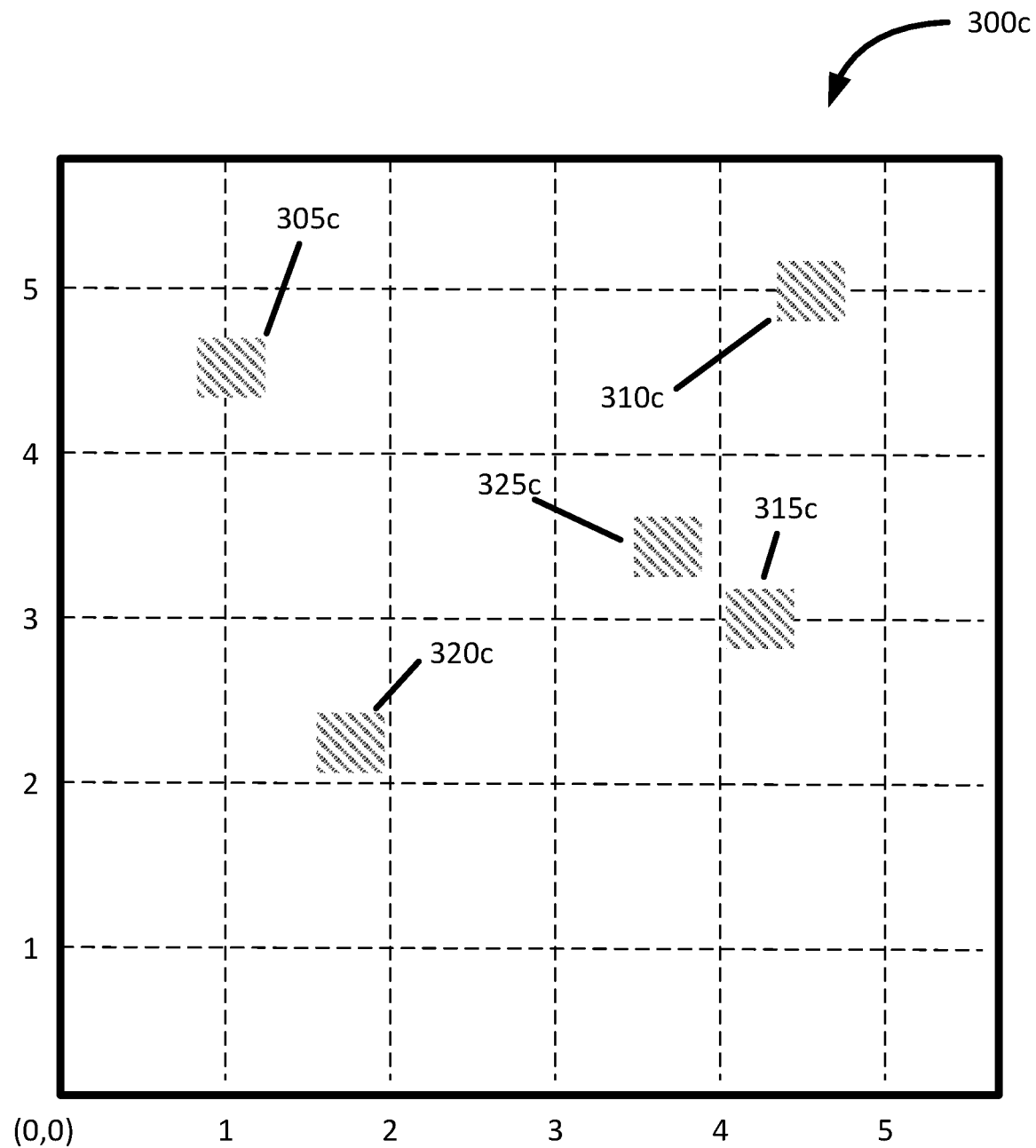

FIG. 5c shows an image 300c of a printed document with five features. The printed document shown in FIG. 5c is the same printed document as the one used for the image 300a. The image 300c was captured under different conditions from the conditions used to capture the image 300a or the image 300b. Accordingly, the image 300c includes a first feature 305c, a second feature 310c, a third feature 315c, a fourth feature 320c, and a fifth feature 325c. Although the features 305c, 310c, 315c, 320c, and 325c correspond to the features 305a, 310a, 315a, 320a, and 325a from the image 300a, their representation in the image 300c is different due to the different conditions under which they were captured. Similarly, the image 300c differs from the image 300b despite being images of the same printed document.

Figure 5D:
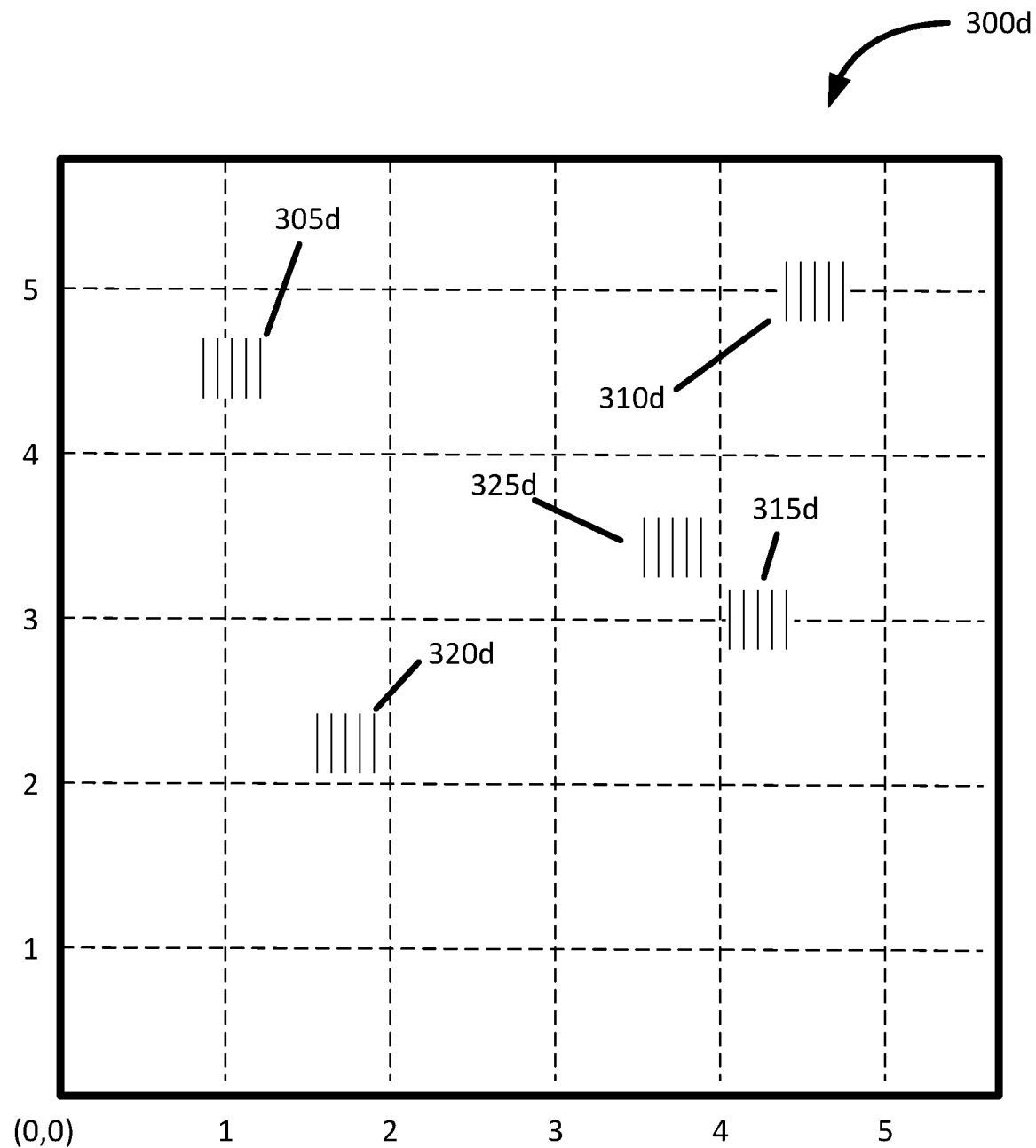

FIG. 5d shows an image 300d of a printed document with five features. The printed document shown in FIG. 5d is the same printed document as the one used for the image 300a. The image 300d was captured under different conditions from the conditions used to capture the image 300a. Accordingly, the image 300d includes a first feature 305d, a second feature 310d, a third feature 315d, a fourth feature 320d, and a fifth feature 325d. Although the features 305d, 310d, 315d, 320d, and 325d correspond to the features 305a, 310a, 315a, 320a, and 325a from the image 300a, their representation in the image 300b is different due to the different conditions under which they were captured. Similarly, the image 300d differs from each of the image 300b and the image 300c despite being images of the same printed document.

Figure 5E:
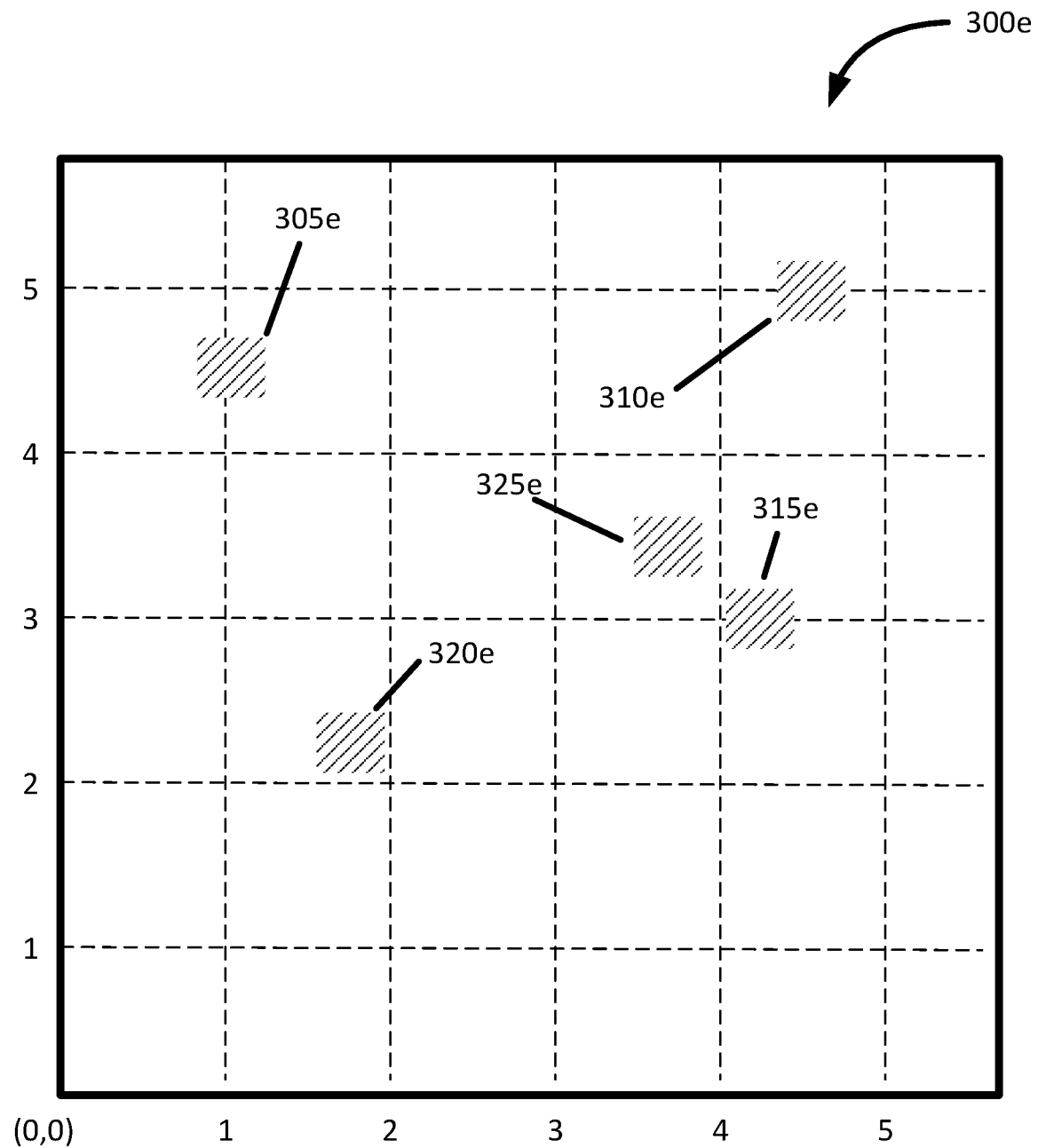

FIG. 5e shows an image 300e of a printed document with five features. The printed document shown in FIG. 5e is the same printed document as the one used for the image 300a. The image 300e was captured under different conditions from the conditions used to capture the image 300e. Accordingly, the image 300e includes a first feature 305e, a second feature 310e, a third feature 315e, a fourth feature 320e, and a fifth feature 325e. Although the features 305e, 310e, 315e, 320e, and 325e correspond to the features 305a, 310a, 315a, 320a, and 325a from the image 300a, their representation in the image 300e is different due to the different conditions under which they were captured. Similarly, the image 300e differs from each of the image 300b, the image 300c, and the image 300d despite being images of the same printed document.

Continuing with the present example, FIGS. 6a to 6e show five processed images 300a' to 300e' (generically, these images are referred to herein as "image 300'" and collectively they are referred to as "images 300'", this nomenclature is used elsewhere in this description) of the images 300a to 300e, respectively. In the present example, the images 300' were processed by the OCR engine 25 or the OCR engine 125 to generate the images 300' with embedded text where the corresponding features were.

Referring to FIGS. 5a and 6a, the first feature 305a is associated with the character 305a'; the second feature 310a is associated with the character 310a'; the third feature 315a is associated with the character 315a'; and the fourth feature 320a is associated with the character 320a'. In FIG. 6a, there is no corresponding character to the feature 325a. The image 300' is also assigned the same coordinate system as in the image 300. In the present example, the coordinate system is a Cartesian coordinate system where the values are arbitrarily assigned across the image.

The character 305a' appears at a position approximately (1.10,4.60) on the assigned coordinate system, which is the same as the position of the original feature 305a. In the present example, the character 305a' is "A". The manner by which the character 305a' was determined is not particularly limited. In the present example, OCR engine 125 was applied to the image 300a.

The character 310a' appears at a position approximately (4.60,5.00) on the assigned coordinate system, which is the same as the position of the original feature 310a. In the present example, the character 310a' is "Z". The character 310a' is obtained in a similar manner as the character 305a' with the OCR engine 125.

The character 315a' appears at a position approximately (4.15,3.00) on the assigned coordinate system, which is the same as the position of the original feature 315a. In the present example, the character 315a' is "D". The character 315a' is obtained in a similar manner as the character 305a' and the character 310a' with the OCR engine 125.

The character 320a' appears at a position approximately (1.75,2.30) on the assigned coordinate system, which is the same as the position of the original feature 320a. In the present example, the character 320a' is "r". The character 320a' is obtained in a similar manner as the character 305a', the character 310a', and the character 315a' using the OCR engine 125.

In the image 300a, the OCR engine 125 did not associate a character with the feature 325a. Accordingly, the space where the feature 325a appears is not occupied by embedded text.

In the present example, the character 305a', the character 310a', the character 315a', and the character 320a' along with their positions form an output dataset associated with the image 300a. The character 305a', the character 310a', the character 315a', and the character 320a' need not all be obtained using the same method. For example, some of the characters may be obtained from user input while other may be obtained via the application of an OCR algorithm by the OCR engine 125. In such examples, the OCR algorithm may be applied and evaluated for quality such that if the quality standard falls below a threshold, the OCR engine 125 may prompt a user for manual input via the user interface 145.

Referring to FIGS. 5b and 6b, the first feature 305b is associated with the character 305b'; the third feature 315b is associated with the character 315b'; the fourth feature 320b is associated with the character 320b'; and the fifth feature 325b is associated with the character 325b'. In FIG. 6b, there is no corresponding character to the feature 310b. The image 300b' is also assigned the same coordinate system as in the image 300b. In the present example, the coordinate system is a Cartesian coordinate system where the values are arbitrarily assigned across the image.

The character 305b' appears at a position approximately (1.10,4.60) on the assigned coordinate system, which is the same as the position of the original feature 305b. In the present example, the character 305b' is "B". The manner by which the character 305b' was determined is not particularly limited. In the present example, OCR engine 125 was applied to the image 300b. Due to the differences arising from the different conditions under which the image 300a and the image 300b were captured, the feature 305a and the feature 305b are different. In particular, the OCR engine 125 recognized different characters despite the fact that both of the feature 305a and the feature 305b are visual representations of the same portion of the printed document.

The character 315b' appears at a position approximately (4.15,3.00) on the assigned coordinate system, which is the same as the position of the original feature 315b. In the present example, the character 315b' is "O". The character 315b' is obtained in a similar manner as the character 305b' with the OCR engine 125.

The character 320b' appears at a position approximately (1.75,2.30) on the assigned coordinate system, which is the same as the position of the original feature 320b. In the present example, the character 320b' is "r". The character 320b' is obtained in a similar manner as the character 305b' and the character 315b' using the OCR engine 125. In this example, the character 320b' matches the character 320a' based on an analysis of the another image.

The character 325b' appears at a position approximately (3.60,3.50) on the assigned coordinate system, which is the same as the position of the original feature 325b. In the present example, the character 325b' is "Q". The character 325b' is obtained in a similar manner as the character 305b', the character 315b', and the character 320b' with the OCR engine 125.

In the image 300b, the OCR engine 125 did not associate a character with the feature 310b. Accordingly, the space where the feature 310b appears is not occupied by embedded text.

Referring to FIGS. 5c and 6c, the first feature 305c is associated with the character 305c'; the third feature 315c is associated with the character 315c'; the fourth feature 320c is associated with the character 320c'; and the fifth feature 325c is associated with the character 325c'. In FIG. 6c, there is no corresponding character to the feature 310c from the image 300c. The image 300c' is also assigned the same coordinate system as in the image 300c. In the present example, the coordinate system is a Cartesian coordinate system where the values are arbitrarily assigned across the image.

The character 305c' appears at a position approximately (1.10,4.60) on the assigned coordinate system, which is the same as the position of the original feature 305c. In the present example, the character 305c' is "B". The manner by which the character 305c' was determined is not particularly limited. In the present example, OCR engine 125 was applied to the image 300c. In this example, the character 305c' matches the character 305b', which are both not consistent with the character 305a'.

The character 315c' appears at a position approximately (4.15,3.00) on the assigned coordinate system, which is the same as the position of the original feature 315c. In the present example, the character 315c' is "O". The character 315c' is obtained in a similar manner as the character 305c' with the OCR engine 125.

The character 320c' appears at a position approximately (1.75,2.30) on the assigned coordinate system, which is the same as the position of the original feature 320c. In the present example, the character 320c' is "S". The character 320c' is obtained in a similar manner as the character 305c' and the character 315c' using the OCR engine 125.

The character 325c' appears at a position approximately (3.60,3.50) on the assigned coordinate system, which is the same as the position of the original feature 325c. In the present example, the character 325c' is "Q". The character 325c' is obtained in a similar manner as the character 305c', the character 315c', and the character 320c' with the OCR engine 125.

In the image 300c, the OCR engine 125 did not associate a character with the feature 310c. Accordingly, the space where the feature 310c appears is not occupied by embedded text.

Referring to FIGS. 5d and 6d, the first feature 305d is associated with the character 305d'; the third feature 315d is associated with the character 315d'; the fourth feature 320d is associated with the character 320d'; and the fifth feature 325d is associated with the character 325d'. In FIG. 6d, there is no corresponding character to the feature 310d from the image 300d. The image 300d' is also assigned the same coordinate system as in the image 300d. In the present example, the coordinate system is a Cartesian coordinate system where the values are arbitrarily assigned across the image.

The character 305d' appears at a position approximately (1.10,4.60) on the assigned coordinate system, which is the same as the position of the original feature 305d. In the present example, the character 305d' is "C". The manner by which the character 305d' was determined is not particularly limited. In the present example, OCR engine 125 was applied to the image 300d. In this example, the character 305d' does not match any of the characters 305a', the characters 305b', and the characters 305c'.

The character 315d' appears at a position approximately (4.15,3.00) on the assigned coordinate system, which is the same as the position of the original feature 315d. In the present example, the character 315d' is "O". The character 315d' is obtained in a similar manner as the character 305d' with the OCR engine 125.

The character 320d' appears at a position approximately (1.75,2.30) on the assigned coordinate system, which is the same as the position of the original feature 320d. In the present example, the character 320d' is "r". The character 320d' is obtained in a similar manner as the character 305d' and the character 315d' with the OCR engine 125.

The character 325d' appears at a position approximately (3.60,3.50) on the assigned coordinate system, which is the same as the position of the original feature 325d. In the present example, the character 325d' is "Q". The character 325d' is obtained in a similar manner as the character 305d', the character 315d', and the character 320d' with the OCR engine 125.

In the image 300d, the OCR engine 125 did not associate a character with the feature 310d. Accordingly, the space where the feature 310d appears is not occupied by embedded text.

Referring to FIGS. 5e and 6e, the first feature 305e is associated with the character 305e'; the third feature 315e is associated with the character 315e'; and the fourth feature 320e is associated with the character 320e'. In FIG. 6e, there is no corresponding character to the feature 310e or the feature 325e from the image 300e. The image 300e' is also assigned the same coordinate system as in the image 300e. In the present example, the coordinate system is a Cartesian coordinate system where the values are arbitrarily assigned across the image.

The character 305e' appears at a position approximately (1.10,4.60) on the assigned coordinate system, which is the same as the position of the original feature 305e. In the present example, the character 305e' is "B". The manner by which the character 305e' was determined is not particularly limited. In the present example, OCR engine 125 was applied to the image 300e.

The character 315e' appears at a position approximately (4.15,3.00) on the assigned coordinate system, which is the same as the position of the original feature 315e. In the present example, the character 315e' is "O". The character 315e' is obtained in a similar manner as the character 305e' with the OCR engine 125.

The character 320e' appears at a position approximately (1.75,2.30) on the assigned coordinate system, which is the same as the position of the original feature 320e. In the present example, the character 320e' is "S". The character 320e' is obtained in a similar manner as the character 305e' and the character 315e' using the OCR engine 125.

In the image 300e, the OCR engine 125 did not associate a character with the feature 310e or the feature 325e. Accordingly, the space where the feature 310e and the feature 325e appear is not occupied by embedded text.

Referring to FIG. 7, a final output dataset based on the images 300 is applied to the image 300f. Based on the consensus for the characters, the image 300f includes embedded text where the apparatus 110 has determined that a character is present. In the present example, the image 300f includes a character 305f, a character 315f, a character 320f, and a character 325f. Based on the consensus between the dataset, the character 305f is "B"; the character 315f is "O"; the character 320f is "r"; and the character 325f is "Q".

Figure 8:
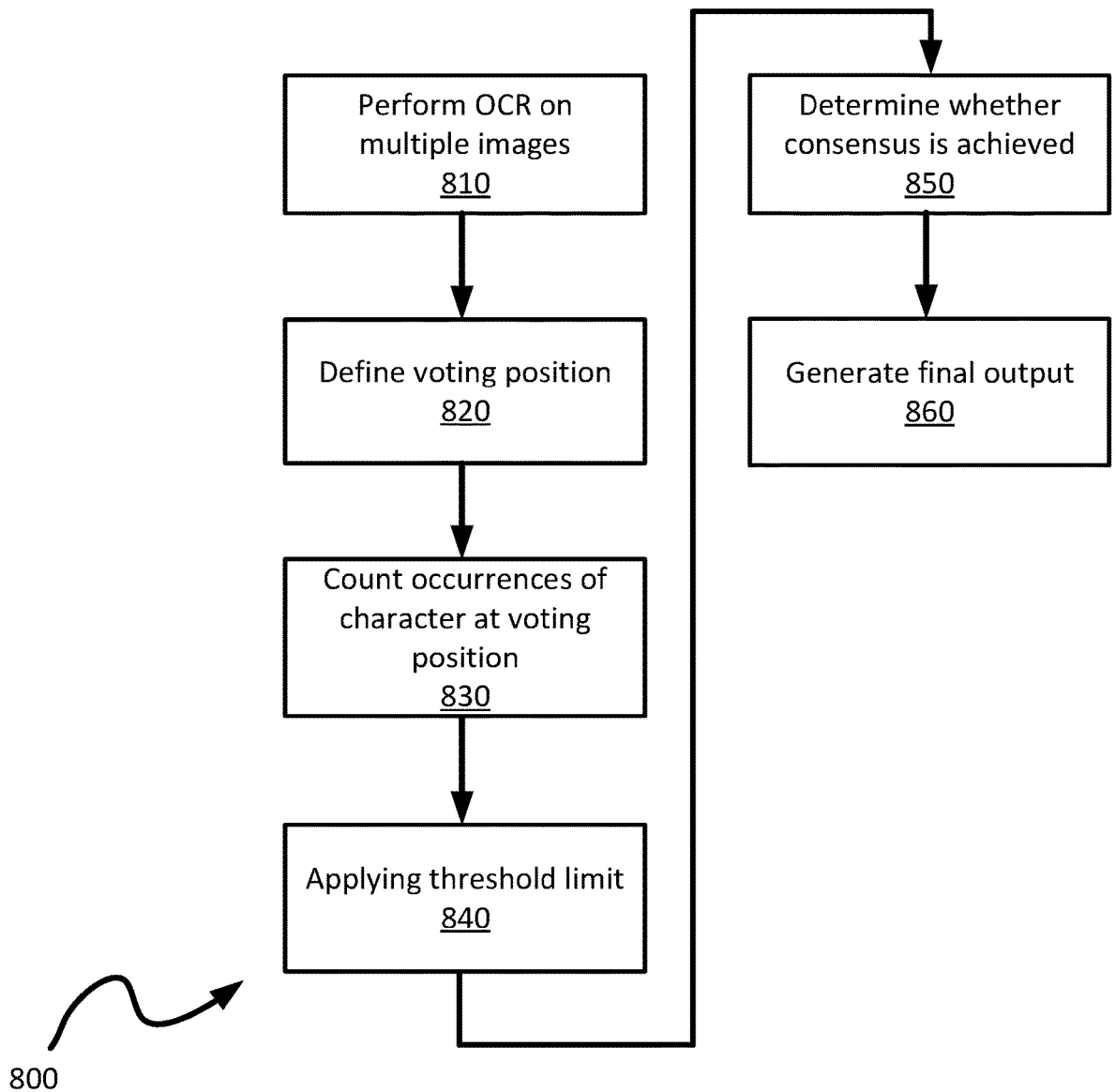
FIG. 8 is a flowchart of an example of another method of optical character recognition using a threshold.

Referring to FIG. 8, a flowchart of another method of recognizing characters in a printed document is shown at 800. In order to assist in the explanation of method 800, it will be assumed that method 800 is performed using the apparatus 110 on the example above illustrated in FIGS. 5 to 7, and specifically by the processor 120. The method 800 is one way in which apparatus 110 may be configured. Furthermore, the following discussion of method 800 will lead to a further understanding of the processor 120, and the apparatus 110 along with its various components.

Block 810 is similar to blocks 210, and 220 from the method 200. In the present example, block 810 may be assumed to have been carried out on the images 300 to produce a five output datasets of characters.

In block 820, the processor 120 defines a voting position. The processor defines the voting position to be a position within an image that may be associated with a feature and/or character. The position may identify a portion of the image where the size of the portion is not limited. In the present example, the voting positions may be defined to correspond to the features in the images 300. In particular, the voting positions may be defined by selecting a regions identified by the features, such as the feature 305a, the feature 310a, the feature 315a, the feature 320a, and the feature 325a, to be (1.10,4.60), (4.60,5.00), (4.15,3.00), (1.75,2.30), and (3.60, 3.50).

In another example, the voting position may be defined by selecting regions based on the output dataset shown in the processed images 300'. In examples where the images 300 are slightly misaligned, such that the feature 305a may have different coordinates from the feature 305b. Therefore, the voting position for each processed image 300' may be shifted to achieve better alignment of the features and characters. Accordingly, a region of the voting position defined based on the output dataset of the processed image 300a' may have different coordinates with a region of the voting position defined based on the output dataset position in the processed image 300b'.

In another example, where the images 300' are shifted due to the image capture process, the processor 120 may perform an alignment based on the output datasets. Once an alignment procedure is applied, the voting positions may share common coordinates.

In block 830, the processor 120 counts occurrences of a character associated with the voting position. Continuing with the present example presented above, the output dataset of the images 300' may be defined to have five voting positions as described above. In the first voting position at (1.10,4.60), the processor 120 counts three instances of "B"; one instance of "A"; and one instance of "C". In the second voting position at (4.60,5.00), the processor 120 one instance of "Z". In the third voting position at (4.15,3.00), the processor 120 counts four instances of "O"; and one instance of "D". In the fourth voting position at (1.75,2.30), the processor 120 counts three instances of "r", and two instances of "S". In the fifth voting position at (3.60,3.50), the processor 120 counts three instances of "Q".

In optional block 840, the processor 120 applies a threshold limit to the counting process. In the present example, the threshold is set at two. Accordingly, any character with less than two counts will be discarded from further consideration. Applied to the present example, some of the counts are discarded. For example, in the first voting position at (1.10, 4.60), the counts are three instances of "B". In the second voting position at (4.60,5.00), there are no character counts. In the third voting position at (4.15,3.00), the counts are four instances of "O". In the fourth voting position at (1.75,2.30), the counts are three instances of "r"; and two instances of "S". In the fifth voting position at (3.60,3.50), the counts remain at three instances of "Q".

The threshold value may be set higher or lower and may be varied according to the number of processed images 300'. For example, if a large number of processed images 300' are available, the threshold may be set higher than two. The threshold may also be set at one. In other examples, the threshold value may be used to indicate a consensus regardless of without looking at relative count numbers to determine a majority. In such examples, it is possible to assign more than one character at each voting position.

In block 850, the determination of whether a consensus is achieved. In the present example, the character with the highest count achieves the consensus at the voting position. Continuing with the present example, the following consensus is achieved. In the first voting position at (1.10,4.60), the consensus character is "B". In the second voting position at (4.60,5.00), the consensus is that no characters are present in this voting position. In the third voting position at (4.15, 3.00), the consensus character is "O". In the fourth voting position at (1.75,2.30), the consensus character is "r", since it has a majority over the character "S". In the fifth voting position at (3.60,3.50), the consensus character is "Q".

Although the present example shows a simple counting process where all processed images 300' are counted equally, other examples may involve weighting. In such examples, the processor 120 may apply a weighting scheme to one or more of the output datasets, which may include pluralities of characters. The weighting may be applied based on a confidence level in the data set. For example, if an OCR engine 125 is documented and know to excel in some conditions, processed imaged 300' derived from images 300 having conditions more optimal to the OCR engine 125 may be provided a larger weight. As another example, weighting may be based on an output intrinsic to the optical character recognition engine 125. In other examples, the weighting may be based on expectations from historical data associated with different settings and conditions. In other examples, the weighting can be based on known performance and reliability under specific settings and conditions for the optical character recognition engine 125.

In block 860, the processor 120 generates a final output data set based on the consensus for the character at each voting position. In the above example, the processor 120 generates the final output dataset applied to the image 300f as shown in FIG. 7.

It should be recognized that features and aspects of the various examples provided above may be combined into further examples that also fall within the scope of the present disclosure.

What is claimed is:

1. An apparatus comprising:
   a memory to store a first image of a document and a second image of the document, wherein the first image and the second image are captured under different conditions, wherein the first image and the second image contain a character; and
   a processor coupled to the memory, wherein the processor is to:
      perform optical character recognition on the first image to generate a first output dataset;
      perform optical character recognition on the second image to generate a second output dataset;
      determine whether consensus for optical character recognition of the character is achieved based on a majority count of the character as determined from the first output dataset and the character as determined from the second output dataset; and
      generate a final output dataset based on the consensus for the character.

2. The apparatus of claim 1, wherein the processor is to perform an alignment based on the first output dataset and the second output dataset.

3. The apparatus of claim 1, wherein the processor is to define a voting position, wherein the processor is to select a first region from the first image to be associated with the voting position, and wherein the processor is to select a second region from the second image to be associated with the voting position.

4. The apparatus of claim 3, wherein the first region is based on the first output dataset.

5. The apparatus of claim 4, wherein the second region is based on the second output dataset.

6. The apparatus of claim 5, wherein the processor is to count occurrences of a character associated with the voting position to determine whether the consensus is achieved.

7. The apparatus of claim 6, wherein the processor is to apply a weighting scheme to the first output dataset and the second output dataset.

8. A non-transitory machine-readable storage medium encoded with instructions executable by a processor, the non-transitory machine-readable storage medium comprising:
   instructions to generate a first plurality of characters from optical character recognition of a first image containing a region of text;
   instructions to generate a second plurality of characters from optical character recognition of a second image containing the region of text;
   instructions to count occurrences of a character in the first plurality of characters and the second plurality of characters to establish a majority in the region of text; and
   instructions to generate a final output dataset based on the majority for the character.

9. The non-transitory machine-readable storage medium of claim 8, comprising instructions to capture the first image using an image sensor.

10. The non-transitory machine-readable storage medium of claim 9, comprising instructions to capture the second image using an image sensor.

11. The non-transitory machine-readable storage medium of claim 8, comprising instructions to define a voting position, wherein the processor selects a first region from the first image to be associated with the voting position and the processor selects a second region from the second image to be associated with the voting position.

12. The non-transitory machine-readable storage medium of claim 11, comprising instructions to count occurrences of a character associated with the voting position to determine whether the majority is achieved.

13. An apparatus comprising:
   a communications interface to communicate with a network;
   a user interface to receive input from a user and to generate output;
   an image sensor;
   a memory to store a first image and a second image, wherein the first image and the second image are images of a document captured under different conditions, wherein the first image and the second image are received via one of the communication interface or the image sensor, wherein the first image and the second image contain a character; and
   a processor coupled to the memory, the communication interface, the user interface, and the image sensor, wherein the processor is to:
      perform optical character recognition on the first image to generate a first plurality of characters;
      perform optical character recognition on the second image to generate a second plurality of characters;
      determine whether consensus for optical character recognition of the character is achieved based on a majority count of the character as determined from the first plurality of characters and the character as determined from the second plurality of characters; and
      generate a final output dataset based on the consensus for the character.

14. The apparatus of claim 13, wherein the processor is to perform an alignment based on the first plurality of characters and the second plurality of characters.

15. The apparatus of claim 14, wherein the processor is to apply a weighting scheme to the first plurality of characters and the second plurality of characters.

* * * * *